(12) United States Patent
Shepherd

(10) Patent No.: US 6,766,939 B2
(45) Date of Patent: Jul. 27, 2004

(54) SOLID PHASE WELDING

(75) Inventor: Gerald E Shepherd, Bristol (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 10/257,137

(22) PCT Filed: Mar. 30, 2001

(86) PCT No.: PCT/GB01/01421
§ 371 (c)(1),
(2), (4) Date: Oct. 9, 2002

(87) PCT Pub. No.: WO01/76804
PCT Pub. Date: Oct. 18, 2001

(65) Prior Publication Data
US 2003/0102355 A1 Jun. 5, 2003

(30) Foreign Application Priority Data
Apr. 11, 2000 (GB) .............................. 0008919

(51) Int. Cl.⁷ .............................................. B23K 20/12
(52) U.S. Cl. ...................... 228/112.1; 228/2.1; 228/119
(58) Field of Search .............................. 228/119, 112.1, 228/2.1; 428/615

(56) References Cited

U.S. PATENT DOCUMENTS

| | | | |
|---|---|---|---|
| 5,460,317 A | | 10/1995 | Thomas et al. |
| 5,713,507 A | | 2/1998 | Holt et al. |
| 6,237,835 B1 | * | 5/2001 | Litwinski et al. ........ 228/112.1 |
| 6,299,050 B1 | * | 10/2001 | Okamura et al. ........ 228/110.1 |
| 6,328,261 B1 | * | 12/2001 | Wollaston et al. .......... 244/132 |
| 6,419,142 B1 | * | 7/2002 | Larsson ....................... 228/2.1 |
| 6,450,394 B1 | * | 9/2002 | Wollaston et al. ........ 228/112.1 |
| 6,543,721 B2 | * | 4/2003 | Palm ....................... 244/117 R |
| 2001/0038057 A1 | * | 11/2001 | Palm |
| 2001/0052561 A1 | * | 12/2001 | Wollaston et al. |
| 2002/0050508 A1 | * | 5/2002 | Yoshinaga |
| 2003/0102355 A1 | * | 6/2003 | Shepherd .................... 228/119 |
| 2003/0217452 A1 | * | 11/2003 | Talwar et al. ............ 29/402.14 |

FOREIGN PATENT DOCUMENTS

| | | |
|---|---|---|
| EP | 1147846 A1 | * 10/2001 |
| SE | WO 98/45080 | * 10/1998 |

OTHER PUBLICATIONS

Translation of JP-11028585.*
Dawes et al; "Friction Stir Process Welds Aluminum Alloys" Welding Journal, US, American Welding Society, Miami, vol. 75, No. 3, Mar. 1, 1996, pp. 41–45, XP000587301.
Patent Abstract of Japan, vol. 1999, No. 5, May 31, 1999 & JP 11 028585 A (Showa Alum Corp.), Feb. 2, 1999.

* cited by examiner

Primary Examiner—Kiley Stoner
(74) Attorney, Agent, or Firm—Nixon & Vanderhye P.C.

(57) ABSTRACT

The method comprises introducing a tip of a solid phase welding tool between adjacent surfaces of a crack formed in an aircraft skin. The tool is then operated to produce a friction stir weld so as to weld the adjacent surfaces together and thereby repair the crack. Apparatus for performing the method comprises a base having carriage thereon, the arm being pivotally mounted on the carriage and supporting the friction stir welding tool. The position of an arm can be adjusted by a screw which drives the rotating tip of friction stir welding tool into the crack to be repaired. The carriage is then moved along the base to draw the tip along the crack. The apparatus is portable and is particularly useful for repairing a cracked skin on an aircraft.

27 Claims, 9 Drawing Sheets

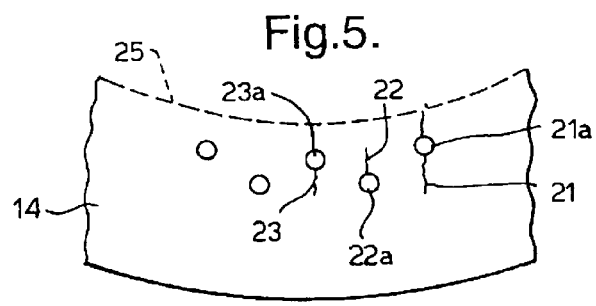
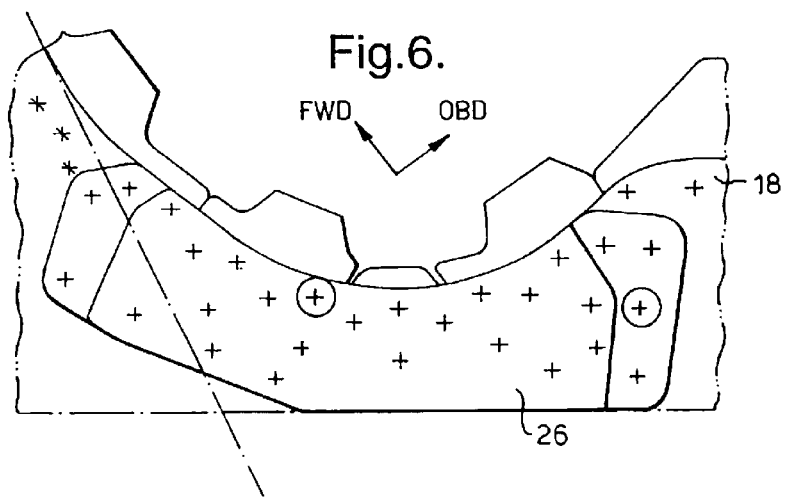
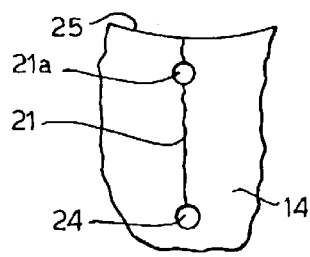
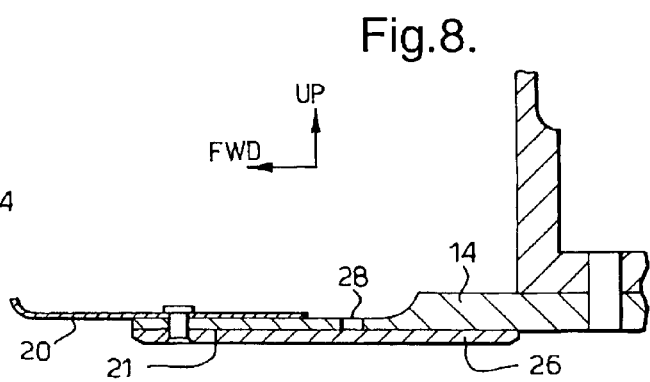

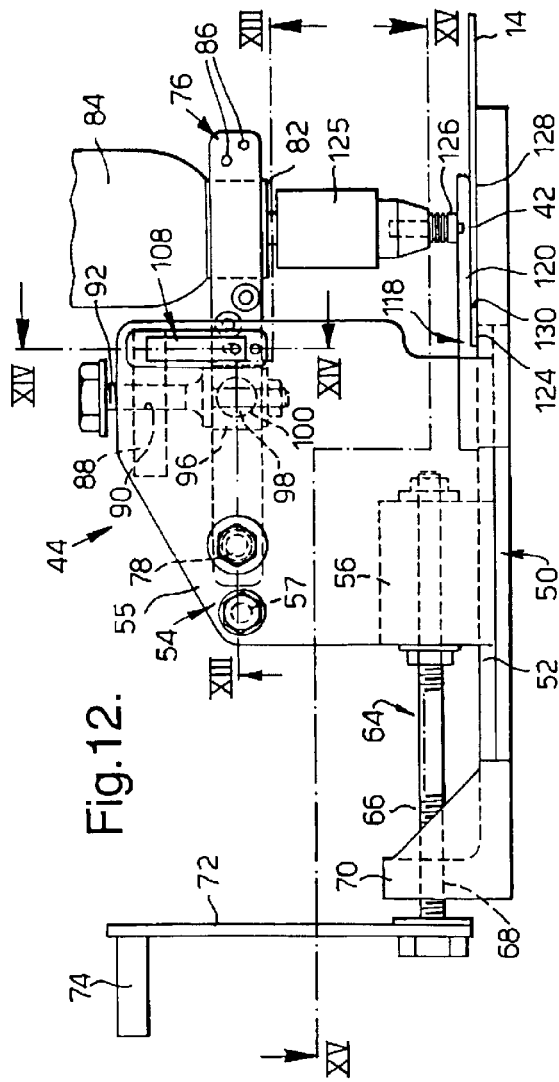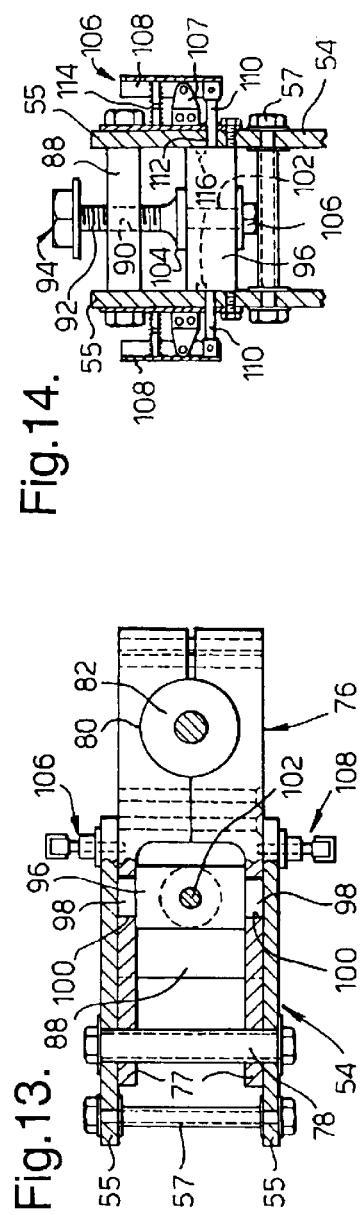

SOLID PHASE WELDING

BACKGROUND OF THE INVENTION

1. Field of the Invention

The present invention relates to solid phase welding. Primarily, the invention is concerned firstly with a method of repairing an aircraft skin such as an aerofoil by solid phase welding and, secondly, with a solid phase welding apparatus

2. Discussion of Prior Art

It is of vital importance that any damage incurred by an aerofoil of an in-service aircraft is repaired immediately and effectively. It is not unusual for cracks to occur in the skin of a leading edge of an aircraft wing. The leading edge of an aircraft wing may be made from a flat sheet of suitable light alloy such as 2024 aluminium alloy of about 3 mm thickness.

The current method of repair of such leading edge cracks involves preventing the crack from extending any further by drilling a hole at each of its ends and then reinforcing the area in the immediate vicinity of the crack, by fastening a plate or bracket over the crack to reduce the level of stress incurred in that area. The disadvantage with such a method is that the repaired area must be continually monitored and frequently inspected to make sure the repaired area is always capable of withstanding the stresses and strains on the aircraft wing when the aircraft is in service.

Traditionally, welding has not been considered as a suitable method of repair of an aircraft skin. This is primarily due to the high residual stress produced at weld toes, caused by the contraction of the material during the welding process. This, in turn, results in increased fatigue in the repaired area, as well as increased crack propagation life. Furthermore, it is extremely difficult to avoid distortion of the thin light alloy material during the welding process.

SUMMARY OF THE INVENTION

One object of the present invention is to provide an improved method of repairing an, aircraft skin, such as used on an aerofoil.

According to a first aspect of the invention there is provided a method of repairing an aircraft skin comprising introducing a solid phase welding tool between adjacent surfaces of the aircraft skin and operating the tool so as to weld the adjacent surfaces together.

The applicants have discovered that solid phase welding may provide a suitably strong weld, and can be used as a method of repair of a crack in an aircraft skin while not jeopardising the properties required throughout the material to provide optimum safety, particularly when the repaired region is subjected to the stresses normally associated with an aircraft during flight, take-off and landing.

The method preferably comprises using a welding tool in the form of a friction stir welding tool.

Friction stir welding is a form of solid phase welding used to produce lap and butt welds in aluminium sheets or plates. The process normally involves plunging a rotating tool slowly into a joint line between two sections of material that are clamped in position to prevent movement. Frictional heat is generated by the welding tool which plasticises the material directly under the tool head. The desired length of weld is achieved by traversing the tool along the weld line and stiring the softened material together. The material does not reach its melting point at any time during the welding process.

The friction stir welding process has many advantages over traditional welding techniques. Most notably, the welded material undergoes very little distortion or shrinkage during the process. The process does not produce any fumes, sparks, porosity or spatter. The process can be repeatedly carried out, efficiently and effectively, on materials that are known as being difficult to weld (such as, for example, 2000 and 7000 series aluminium alloys). Furthermore, the process is energy efficient and suitable for automation. The welding tool is generally non-consumable, and can often be used for up to 1000 m of weld length during its lifetime, before requiring replacement. No filler or gas shielding is required. The mechanical properties of the welds produced are also substantially improved. Friction stir welding provides ease of repair and good post-repair benefit, while avoiding the disadvantages of increased fatigue and stress to the repaired area, due to the fact that the welding is carried out in the solid phase and at a low temperature.

Although friction stir welding is known, per se, as a technique, for joining two metal plates, or two sides of a metal plate, it has never been used before as a method of repairing crack damage in an aircraft skin. Moreover, it has not been considered as a possible method of repair of crucially important components such as an aircraft wing. This is because general welding techniques, particularly on thin light alloy skins used on aircraft have been problematic due to the increased fatigue of the repaired section once it has been subjected to heat, and the material itself has undergone melting. Furthermore, an aircraft would usually be required to be taken out of service in order for any such welding to take place. The aircraft would need to be taken to a specific area where special safety conditions have to be met, in view of the intense heat and sparks that are produced, in order to ensure that the actual welding process could be carried out as safely as possible.

In the preferred embodiment, the method comprises introducing the solid phase welding tool into a crack in the aircraft skin, the adjacent surfaces being defined by edges of the crack. The solid phase welding tool may be introduced at one end of the crack and then moved along the crack to create the weld.

The method may comprise moving the solid phase welding tool through a hole formed in the aircraft skin during the welding operation. The method may also comprise re-forming the hole after the welding has been completed.

The method may comprise positioning a metal element at an edge of the skin to be repaired and moving the solid phase welding tool beyond the edge and into the metal element at the end of the welding process. The metal element can then be removed and the weld at the edge of the skin can be fettled to provide a clean finish.

Preferably, the method comprises positioning the solid phase welding tool so as to extend part way through the thickness of the aircraft skin. In that way, the position of the tool effectively controls the depth of the weld.

Previously, solid phase welding apparatus, and in particular friction stir welding, apparatus has been of a non-portable kind because of problems of workpiece clamping and access requirements. The present invention has addressed this problem and, in that respect the method may comprise mounting a solid phase welding apparatus to the aircraft skin, carrying out the solid phase welding and then removing the solid phase welding apparatus from the aircraft skin.

According to a second aspect of the invention there is provided solid phase welding apparatus comprising a base, a support for a solid phase welding tool movable on the base, and means for mounting the apparatus on a workpiece to be welded, the movement of the support on the base enabling the tool to be moved relative to the workpiece as the tool is operated to produce a weld.

As the solid phase welding is a low temperature process, safety precautions regarding the production of heat and sparks are not as stringent as for general welding techniques. Therefore, it is possible to transport the apparatus, say, to an aircraft, rather than the other way around, and to carry out the friction stir weld on the aircraft while the aircraft remains in its usual resting place.

Preferably, adjustment means is provided on the support for moving the tool towards the workpiece and enabling a desired depth of weld to be produced in the workpiece. Locking means may be provided which locks the tool in a predetermined position to provide the desired depth of weld. The locking means may comprises a locking pin which may be biased towards a locking position. The locking means may be releasable from its locking position by moving it against the bias.

The support may comprise a first part which is movable on the base and a second part such as an arm which is movably mounted on the first part and which is arranged to carry the welding tool. Preferably, the arm is pivotally connected at one end to the first part and is arranged to carry the tool at its other end. Where the aforesaid adjustment means is provided, it may be arranged to control the position of the second part and thereby the position of the tool.

The said adjustment means may be operable by a depth control actuator.

The support may be movable on the base by means of a support actuator.

The depth control actuator and the support actuator are preferably in a control circuit whereby when one of the actuators reaches a given position, the other actuator begins to operate. For example, the support actuator may begin to move the support after the depth control actuator has moved the tool to the desired depth.

Preferably, clamp means is provided for securing the apparatus to the workpiece. In such a case, the clamp means may be mounted to enable the workpiece to be clamped against the base.

BRIEF DESCRIPTION OF THE DRAWINGS

A method and apparatus in accordance with the invention will now be described by way of example with reference to the accompanying drawings in which:

FIG. 5 shows part of a leading edge wing skin in which cracks have developed;

FIG. 6 shows a conventional way in which such cracks would previously have been repaired;

FIG. 7 is a view to a larger scale showing the way in which a crack in FIG. 3 is stopped at one end by means of a stop hole;

FIG. 8 is cross section through part of the repair shown in FIG. 6;

FIG. 12 is an elevation of apparatus in accordance with the invention for producing a friction stir weld;

FIG. 13 is a cross section of the apparatus shown in FIG. 12 on the line XIII—XIII in FIG. 12;

FIG. 14 is a cross section of the apparatus shown in, FIG. 12 on the line XIV—XIV in, FIG. 12;

DETAILED DISCUSSION OF EMBODIMENTS

Figure 1:
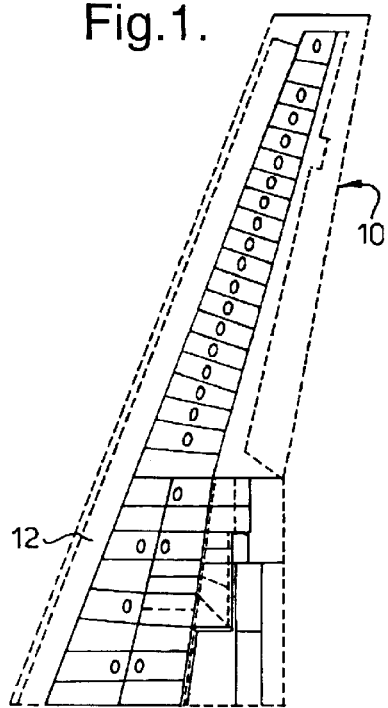
FIG. 1 is a diagrammatic under plan view of an aircraft wing showing the location of an area to be repaired.
Figure 2:
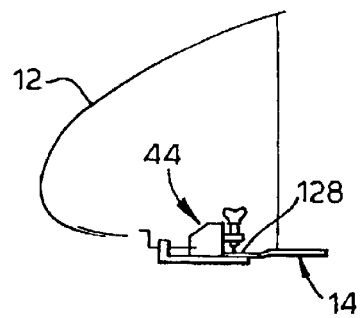
FIG. 2 is a diagrammatic cross section through part of the area indicated in FIG. 1.
Figure 3:
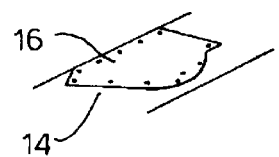
FIG. 3 is a perspective underneath view of the leading edge of the wing at the area to be repaired.

Referring to FIGS. 1, 2 and 3, a wing 10 has a leading edge 12 formed in known manner from light alloy sheet material. The leading edge 12 has a lower skin 14 as shown in FIGS. 2 and 3, the lower skin 14 being provided with an access panel 16 which is held in position by releasable fasteners of known kind.

Figure 4:
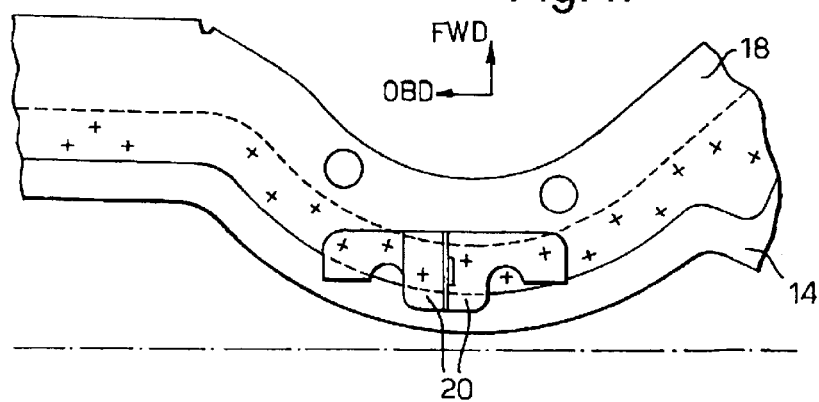
FIG. 4 is an under plan view to a larger scale of the area to be repaired indicated in FIG. 1.

Looking at FIG. 4, the lower skin 14 carries an edge member 18 and landing plates 20 used for the mounting of components (not shown). The edge member 18 and landing plates 20 are attached to the skin 14 by rivets in known manner.

When the aircraft is in service, it is not unusual for cracks to appear in the material forming the leading edge and FIG. 5 illustrates the way in which cracks 21, 22 and 23 have formed through three holes indicated at 21a, 22a and 23a.

FIGS. 6 and 7 serve to show the way in which the lower skin 14 can be repaired when cracks occur as shown in FIG. 5. The rivets holding the edge member 18 and landing plates 20 in position are drilled away so as to leave the lower skin 14 accessible as shown in FIG. 5. Crack stop holes are then drilled at the end of the cracks 21, 22, 23 to prevent them spreading further. It will be noted that the crack 21 passes through the rivet hole 21a and extends to a free edge 25 of lower skin 14. A reinforcing plate 26 is then placed in position against the lower skin 14 and is drilled using the existing rivet holes in the lower skin 14 as guides. The reinforcing plate 26 is then riveted to the lower skin 14 along with the edge member 18 and the landing plates 20.

It will be noted from FIG. 8 that the reinforcing plate 26 is riveted to the lower side of the lower skin 14 and the landing plates 20 are riveted to the upper side. A crack stop plug 28 is inserted and secured within the crack hole 24.

Whilst the conventional way of repairing the skin of an aircraft in the way illustrated in FIGS. 6–8, is reasonably easy to carry out, the repair needs constant monitoring and inspection to ensure that the cracks do not worsen. That particular problem has given rise to the present invention and reference is now made to FIGS. 9 and 10.

Figure 9:
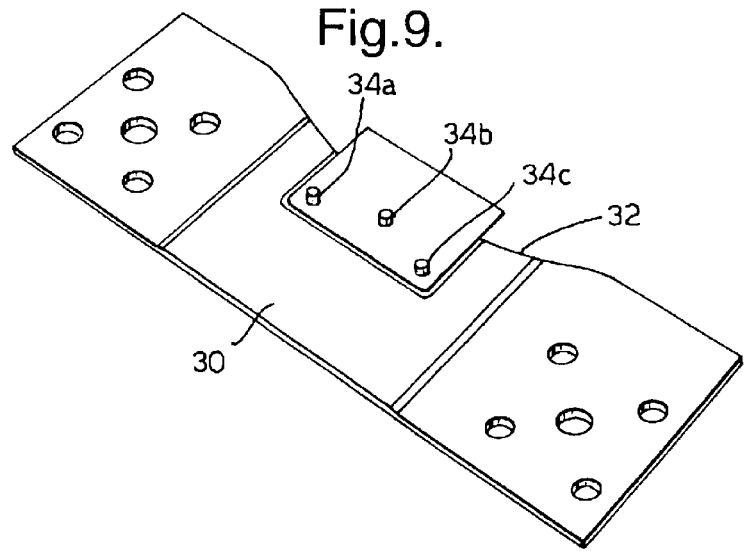
FIG. 9 is a perspective view of a leading edge test coupon used in the development of the present invention.

Looking at FIG. 9, a test coupon 30 was made from the same type of material from which the lower skin 14 of the leading edge 12 is formed. It will be noted that the coupon 30 has a curved edge 32 which simulates as far as possible the free edge 25 of the lower skin 14. Three holes were drilled in the coupon 30 for receiving rivets 34a, 34b, 34c. A fine slot (not shown) was then cut in the coupon 30 extending from the free edge 32 and through and then beyond the hole for rivet 34b somewhat similar to the crack 21 shown in FIG. 5.

Figure 10:
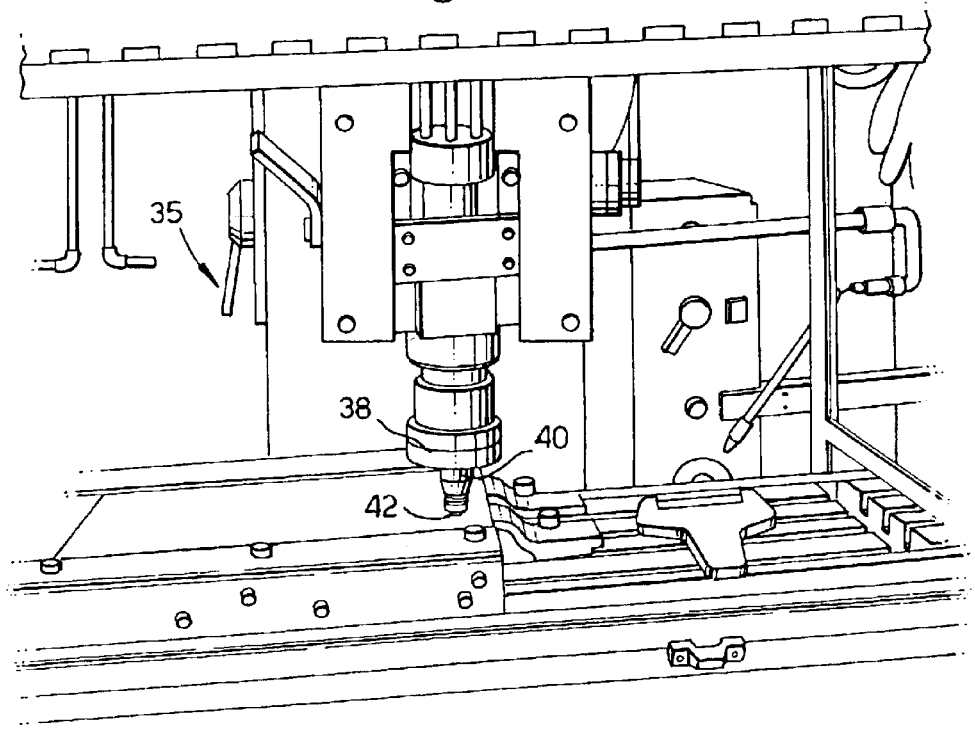
FIG. 10 shows a rig in which a friction stir welding tool is used with a test rig of the kind shown in FIG. 9.

Test coupon 30 was then mounted in a rig, shown in FIG. 10, and a friction stir welding tool 38 of known kind was then used to produce a line of weld through the cut formed in the coupon 30. The friction stir welding tool 38 has a tool head 40 and a non consumable tip 42. To effect the weld, the tool 38 was lowered so that the tip 42 entered the slit in the coupon 30 at the end of the slit remote from the free edge 32. The coupon 30 was then traversed relative to the tool 38 so that the free edge 32 on the coupon 30 moved towards the tip 32 until the entire slit had been traversed by the tip 42. The frictional heat generated by the tip 42 generated heat which placticised the light alloy material, the placticised material being held captive under the tool head 40 during traverse. The rotation of the tip 42 simultaneously stirred the placticised material to effect the weld.

Once the weld had been completed, the test coupon 30 was removed from the rig and the rivet hole for the rivet 34b was re-drilled through the welded material which had accumulated in the former hole in the coupon 30.

Figure 11:
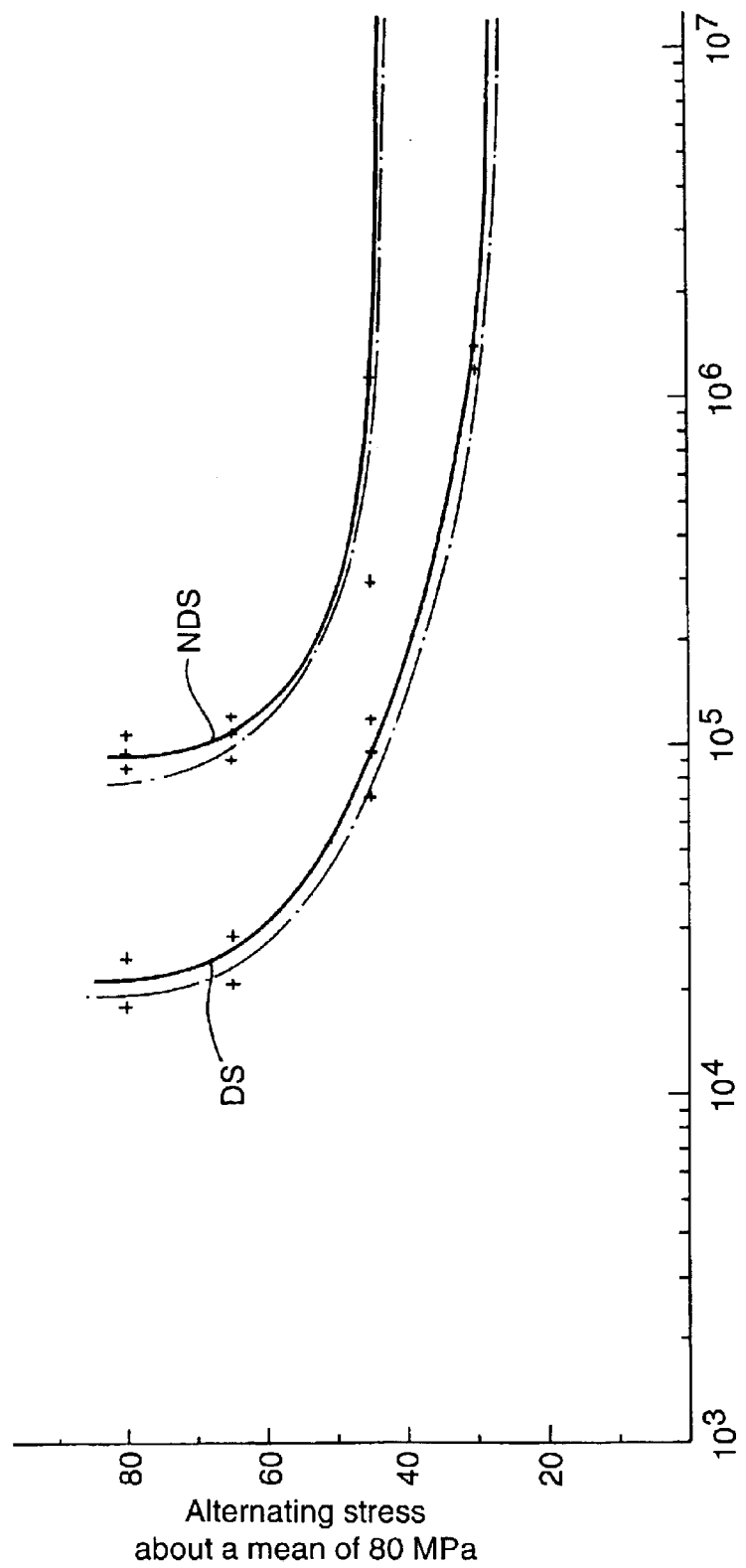
FIG. 11 is a graph showing SN curves for friction stir welded and plain material.

A plate 36 simulating a landing plate was then riveted in position and the coupon 30 was subjected to alternating stress about a mean to produce a fatigue analysis. The fatigue analysis was conducted using Miner's cumulative damage law. A theoretical fatigue duty cycle for take-off, climb, cruise, descent and landing which considers gust loading was used to obtain the damaging cycles on the wing as a ratio of cycles to failure (N) from S-N curves for various alternating stress levels. Comparative coupon testing was made to establish the S-N curves NDS (see FIG. 11) for non-damaged structure against damaged structure DS such as the coupon 30, where a cut had been joined by friction stir welding. FIG. 11 shows the comparative S-N curves. The comparative life factor was established for the stress levels determined as 0.25 based on the ratio of average cycles to failure. The friction stir welded coupon 30 was found to have 0.25 of the life of the non-damaged coupon. It was found that the original structure failed at a rivet hole whereas the friction stir welded coupon 30 cracked from a point initiating at what is called the "root flaw" of the welded cut. The root flaw is created where the friction stir weld does not extend through the full thickness of the material but stops short leaving part of the cut un-welded. The root flaw is typically 0.1 mm in depth.

By removing the stress concentration resulting from a crack, life of the material improves by a factor of 42. By introducing the life factor for a friction stir welded joint at 0.25, the life improvement reduces to a factor of 10.5 which is a significant improvement over the existing methods of repair illustrated in FIGS. 6, 7 and 8. The presence of the root flaw tended to reduce the life factor to 3.5 when compared to existing repair methods. From a commercial point of view, that could effectively delay the initial inspection requirement by 3.5 times and reduce the amount of subsequent inspection required, which is clearly a substantial improvement.

Obviously, an efficient way of producing the friction stir weld is necessary from the point of view of commercial considerations. In that respect, reference is now made to FIGS. 12–15 which show a manually operable portable apparatus 44 for friction stir welding.

Looking at FIG. 12, the apparatus 44 comprises a base 50 formed with a dovetail slideway 52. A carriage 54 (constituting the aforesaid support in the present example) has a slide block 56 attached to it. Carriage 54 comprises side plates 55 which are secured together by spacer bolts 57. The lower edges of the side plates 55 are formed to define angled slides 58 which locate on the slideway 52. One of the slides 57 is provided with a slide pressure plate 60 which is adjustable by means of set screws 62. A shaft indicated generally at 64 is rotatably mounted in the slide block 56 but is prevented from moving axially relative to the slide block. The shaft 64 has a screw threaded portion 66 which extends through a screw threaded aperture 68 in a bracket 70 at the left hand end of the base plate 50 as viewed in FIG. 12. A drive arm 72 is rigidly attached to the shaft 64 beyond the bracket 70. The radially outer end of the drive arm 72 is provided with a handle 74. Rotation of the drive arm 72 turns the shaft 64 and causes the carriage 54 to be moved along the slideway 52.

An arm 76 having spaced apart sections 77 extends between the side plates 55 of the carriage 54 and has one end mounted on a pivot 78 mounted on the two side plates 55. The other end of the arm 76 is formed with an aperture 80 which receives a collar 82 of a high torque power tool 84. The collar is clamped in position by means of pinch-bolts (not shown) which pass through apertures 86 in the arm 76.

A rectangular block 88 is positioned between the spaced apart sections 77 of the arm 76 and is suitably bolted thereto. The block 88 has a central screw threaded bore 90 which receives a screw threaded shank 92 of an adjustment screw 94. An adjustment block 96 is also positioned between the sections 77 of the arm 76 and has stub shafts 98 which are pivotally located in apertures 100 in the sections 77. The screw threaded shank 92 passes with working clearance through a bore 102 in the adjustment block 96, the adjustment block being held captive with working clearance between a flange 104 on the shank 92 and a nut and washer 106 arrangement at the lower end of the shank.

Locking devices 106, 108 are arranged on the outside of each side plate 55 of the carriage 54. The locking device 106 comprises a bracket 107 on which a lock/release arm 108 is pivotally mounted. A locking pin 110 is pivotally connected to the lower end of the lock/release arm 108 as viewed in FIG. 14 and extends slideably through an aperture 112 in its associated side plate 55. The locking pin 110 is biased towards the adjustment block 96 by means of a spring 114. It will be noted that the adjacent end of the adjustment block 96 is formed with a recess 116 which, as shown in FIG. 14, is slightly above the locking pin 110. The locking device 108 is a mirror image of the locking device 106 and is not described in detail.

The base 50 carries a clamping plate 118 which has a portion 120 spaced from an upper surface of the base 50 by a distance corresponding substantially to the thickness of material to be friction stir welded. The section 120 is formed with an elongate aperture 122. In use, suitable toggle clamps (not shown) are mounted on the base 50 using fasteners and selected apertures 51 and apply a downward load to the upper surface of section 120 so as to clamp the material 119 between the clamping plate 118 and the base 50. A sheet of run-out material 124 (eg light alloy) is positioned at the left hand end of the elongate aperture 122 as viewed in FIG. 12 and the function of the run-out plate 124 is described below.

The function of the apparatus 44 shown in FIGS. 12–16 is now described.

Figure 15:
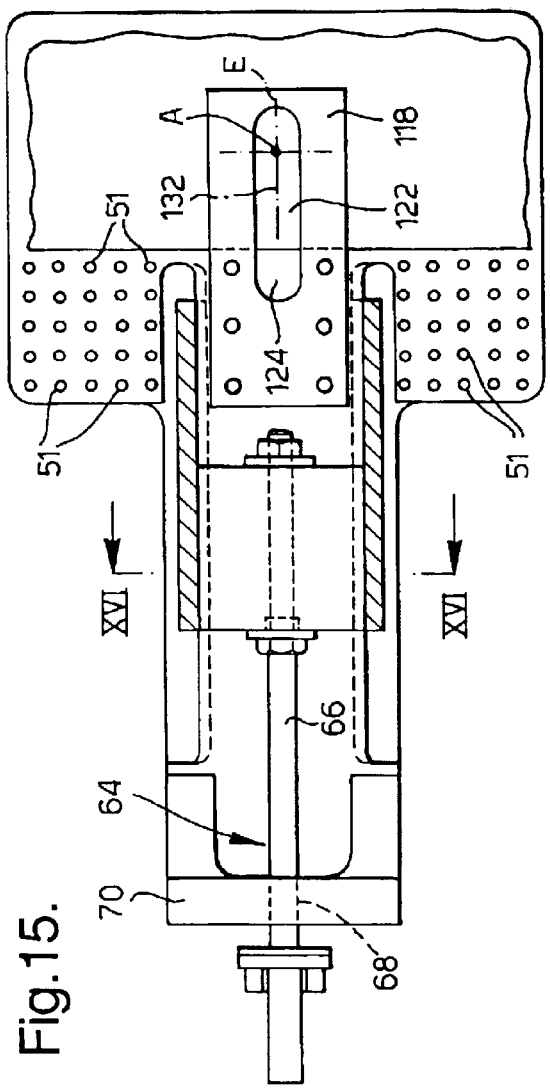
FIG. 15 is a cross section of the apparatus shown in FIG. 12 on the line XV—XV in FIG. 12.
Figure 16:
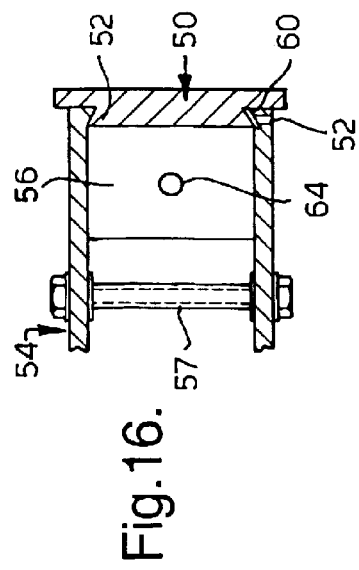
FIG. 16 is a cross section of the apparatus shown in FIG. 15 on line XVI—XVI in FIG. 15.

Initially, the apparatus 44 is set up in a workshop with the power tool 84 clamped in the aperture 80 of the arm 76. The power tool 84 has a chuck 125 in which is secured a friction stir welding tool 126 of known type which includes a tip 42. The axis A of rotation of the tip 42 intersects the axis E of the elongate slot 122 (FIG. 15). The adjustment screw 94 is rotated so as to drive the arm 76 downwardly about the pivot 78 until the locking pins 110 drop into the recesses 116 in the adjustment block 96. In that position, the axial position of the friction stir welding tool is adjusted in the chuck 125 so as to project through the elongate aperture 122 with the lower end of the tip 42 spaced from the base plate 50 by sufficient distance to leave a root flaw of the desired dimension. The friction stir welding tool 126 is then clamped firmly within the chuck 125. The apparatus is then ready to effect a repair.

The apparatus is then taken to an aircraft with a cracked skin on its leading edge and, after removing access panel 16, is positioned as shown in FIG. 2 with a section 128 of the skin 14 clamped as shown in FIG. 11 between the clamping plate 118 and the base 50. It will be noted that an edge 130 of the material section 128 abuts the run-out plate 124. The material section 128 is positioned so that a crack 132 therein (see FIG. 15) is positioned so as to lie centrally and longitudinally of the elongate aperture 122. Firstly, the toggle clamps are applied to hold the material section 128 in place, the power tool 84 is then switched on so as to rotate the friction stir welding tool 126 and the adjustment screw 94 is then turned so as to drive the arm 76 and tool 84 downwardly so that the tip 42 penetrates the skin section 128 at one end of the crack 132. Downward driving of the arm 76 is continued until the locking pins 110 snap into the recesses 116. In that position, the lower end of the tip 42 is correctly positioned for friction stir welding. An operator then uses the handle 74 to rotate the shaft 64 so as to draw the friction stir welding tool 126 along the crack 132 and towards the run-out plate 124. Eventually, the friction stir welding tool moves past the edge 130 of the skin section 128 and moves into the run at plate 124. Once the tip 42 is well clear of the edge 130, the lock/release arms 108 are depressed so as to extract the locking pins 110 from the recesses 116 and the adjustment screw 100 is rotated so as to lift the arm 77 and move the friction stir welding tool 126 clear of the run-out plate 124. The tool 84 is then switched off. Next, the clamps are released and the apparatus 44 is removed from the section of material 128, the section 128 carrying with it the run-out plate 124 which is welded thereto. Once the apparatus 44 has been removed, the run-out plate 124 can be broken away or otherwise separated from the edge 130 of the material 128 and the edge 130 can be dressed in the region of the weld to provide a smooth finish.

Figure 17:
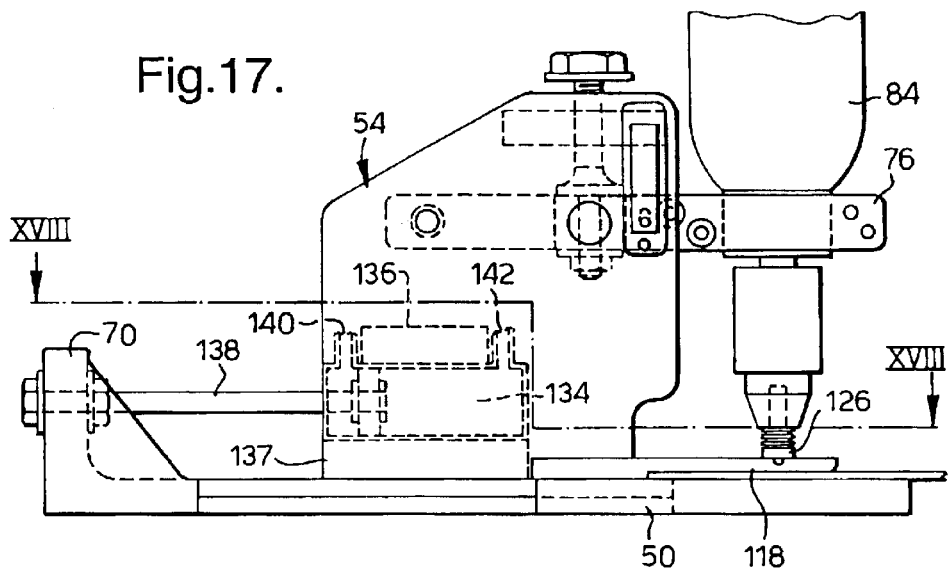
FIG. 17 is an elevation similar to that shown in FIG. 12 of an alternative form of apparatus, the apparatus being actuated by hydraulics.
Figure 18:
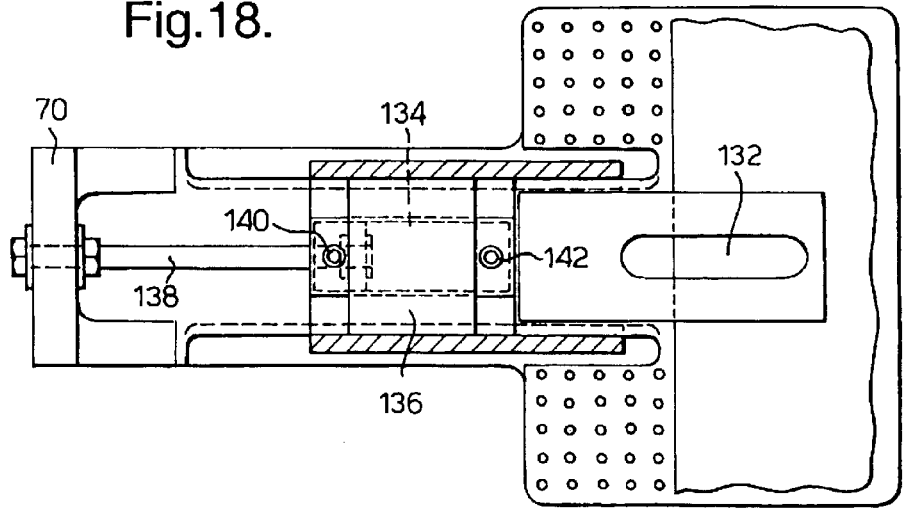
FIG. 18 is a cross section to the part of the apparatus showing in FIG. 17 on the line XVIII—XVIII in FIG. 17.

Reference is now made to FIGS. 17 and 18. The only significant difference between the apparatus shown in FIG. 17 and that shown in FIG. 12 resides in the use of a hydraulic actuator 134 on the carriage 54 which takes the place of the manually rotatable shaft 64. The hydraulic actuator 134 is suitably secured to the carriage 55 by upper and lower blocks 136, 137 and has a push rod 138 having its outer end secured to the bracket 70. The actuator 134 has inlet/outlet ports 140, 142 which are suitably connected to a hydraulic circuit (not shown). In use, the apparatus is set up in the same way as described with respect to FIGS. 12–16 and is used in the same way except that the friction stir welding tool 126 is drawn along the crack 132 by operation of the actuator 134. This embodiment may allow a more consistent rate of traverse of the tool tip 42 along the crack.

Figure 19:
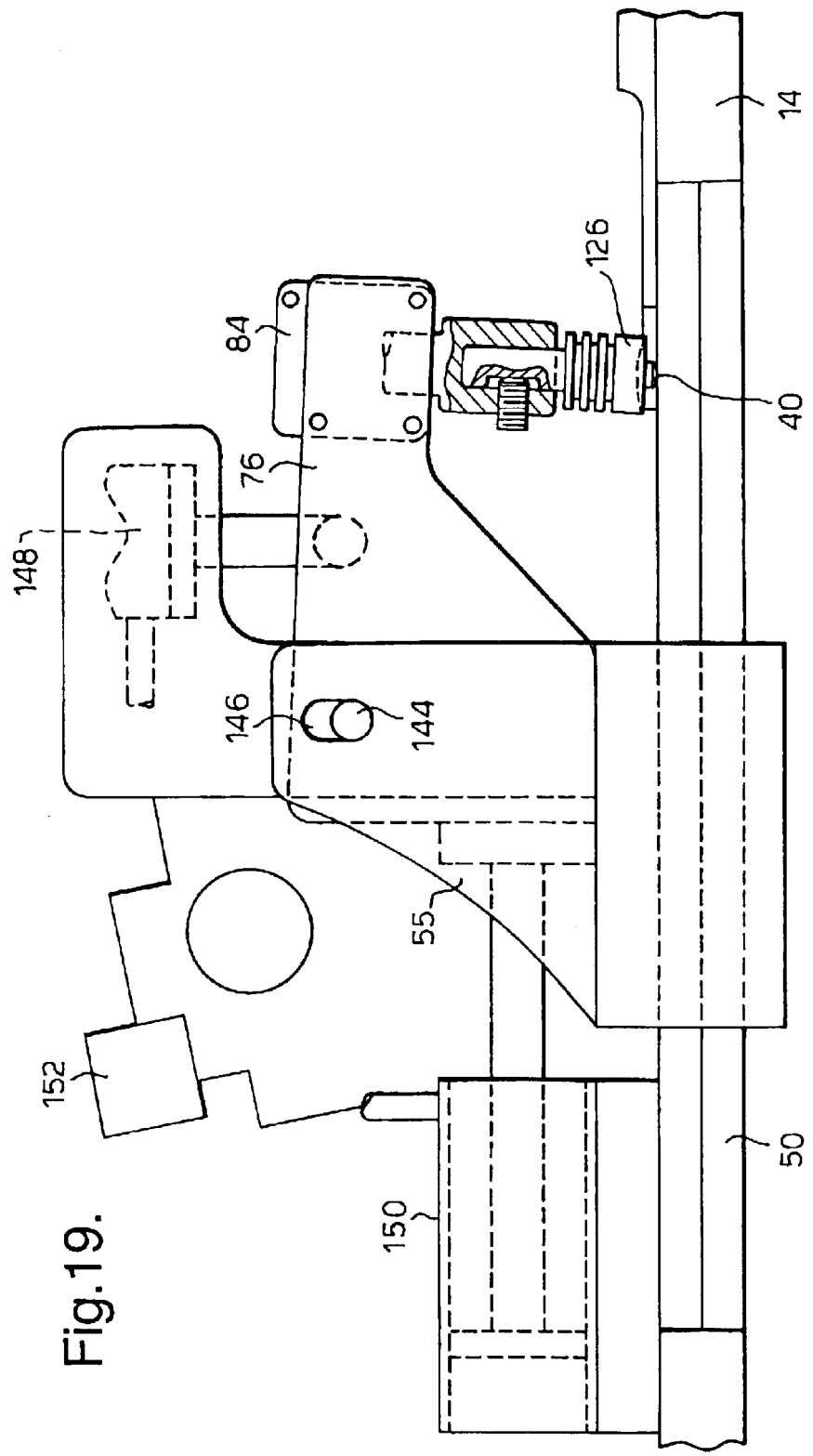
FIG. 19 is an elevation of a further hydraulically actuated apparatus in accordance with the invention and FIG. 20 is a view somewhat similar to FIG. 2 drawn to a larger scale and showing apparatus of the kind shown in FIG. 19 in position on part of the leading edge for effecting a repair.

FIG. 19 shows a different arrangement and parts corresponding to parts in FIGS. 12–18 carry the same reference numerals and will not be described in detail. A base 50 supports a carriage 55 having an arm 76. The arm 76 is mounted on a pivot 144 which is moveable in a vertical slot arrangement 146. The arm 76 suitably carries a high torque power tool 84 arranged to rotate a friction stir welding tool 126. The arm 76 can be driven about the pivot 114 by means of a hydraulic actuator 148. The carriage 55 can be moved along the base 50 by means of a further hydraulic actuator 150. The actuators 148, 150 are arranged in a circuit 152.

The apparatus is set up in a workshop by operating the actuator 148 so as to drive the arm 76 downwards until the tip 40 of the friction stir welding tool is spaced by the required distance from the base 50. With the tip 40 in that position, the hydraulic circuit 152 is set so as to ensure that, is use, the actuator 148 cannot drive the arm 76 further downwards. The circuit 152 is also set so that, in use, once the actuator 148 reaches that position, fluid will be fed to actuator 150 in order to move the carriage 55 along the base 50 thereby drawing the friction stir welding tool 126 along a crack in the material to be repaired.

Figure 20:
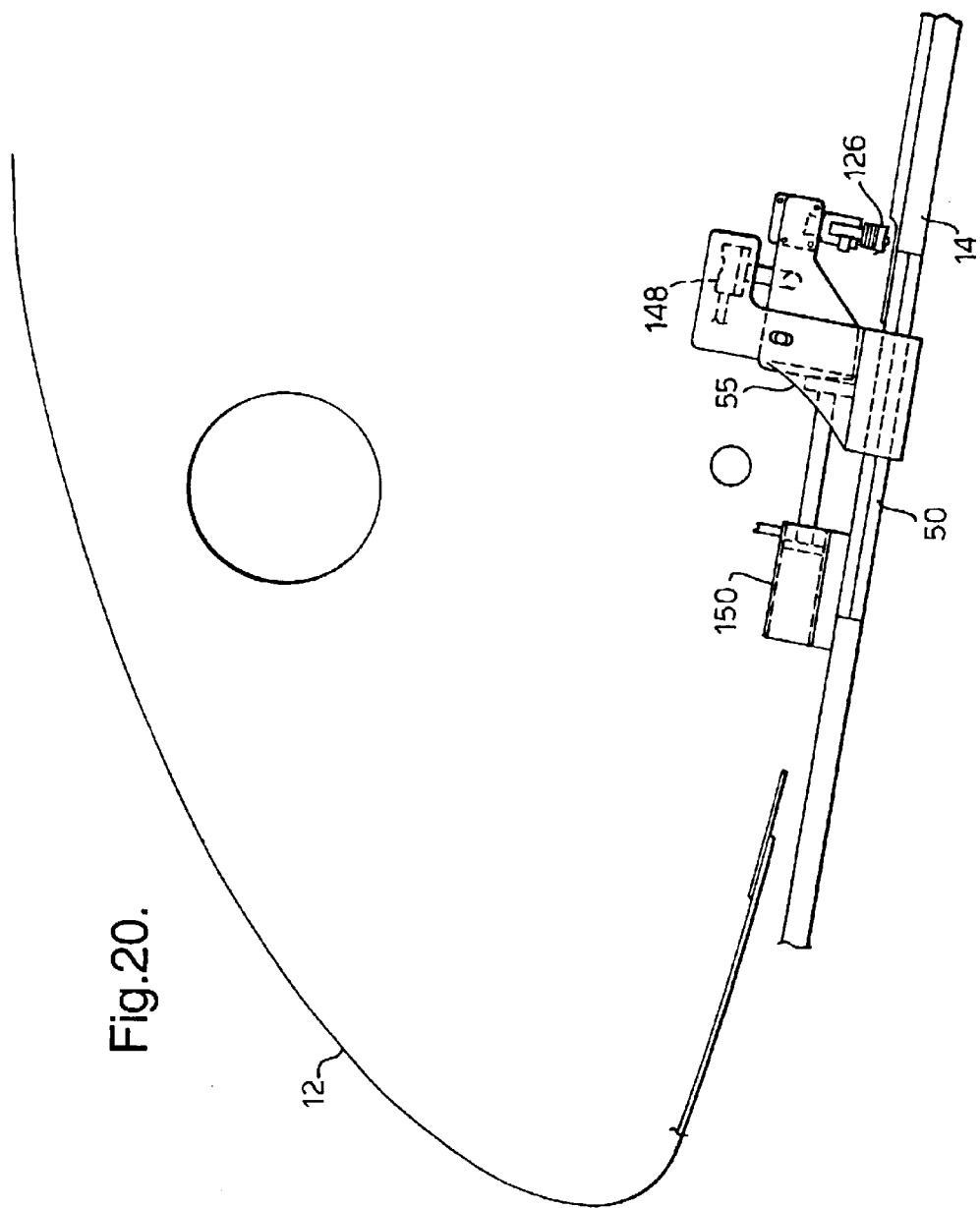

FIG. 20 shows the way in which the apparatus of FIG. 19 can be located on a section of the lower skin 14 of a leading edge 12 which will enable the section to be repaired. Repair is carried out substantially as described with respect to FIGS. 12–17. Once the friction stir welding has been completed, the ram 148 lifts the arm 76 so that the pivot 144 initially rises to the top of the vertical slot arrangement 146 which is then followed by the lifting of the friction stir welding tool 126 clear of the lower skin 14. The apparatus can then be removed from the aircraft.

If desired, the power tool 84 can comprise, say, a hydraulic motor which is operated from a pump at a remote position.

Whilst specific reference has been made to the repair of a leading edge, it will be appreciated that the apparatus described in FIGS. 12–20 could be used to repair other skin sections of an aircraft or could be used in other applications where a friction stir weld is required to repair sheet or plate material. Additionally, the apparatus of the invention could be used in situ, for example in the ship-building or boat building industries, to join plates or sheets of material together.

What is claimed is:

1. A method of repairing an aircraft skin, the method comprising the steps of:
   a). mounting solid phase welding apparatus to the aircraft skin in the region to be repaired;
   b). positioning a metal element at an edge of the aircraft skin in the vicinity of the region to be repaired;
   c). introducing a solid phase welding tool between adjacent surfaces of the aircraft skin, the solid phase welding tool forming part of the solid phase welding apparatus;
   d). operating the solid phase welding tool to weld the adjacent surfaces together;
   e). moving the solid phase welding tool beyond the edge of the aircraft skin and into the metal element at the end of the welding process;

f). removing the solid phase welding apparatus from the aircraft skin; and g). separating the metal element from the edge of the aircraft skin.

2. A method according to claim 1, further comprising the step of dressing the edge in the region of the weld to provide a smooth finish.

3. A method according to claim 1, wherein step c). comprises using a welding tool in the form of a friction stir welding tool.

4. A method according to claim 1, wherein step c). comprises introducing the solid phase welding tool into a crack in the aircraft skin, the adjacent surfaces being defined by edges of the crack.

5. A method according to claim 1, wherein steps c). and d). comprise introducing the solid phase welding tool at one end of the crack and moving it along the crack to create the weld.

6. A method according to claim 1, wherein step e). comprises moving the solid phase welding tool through a hole formed in the aircraft skin during the welding operation.

7. A method according to claim 6, wherein step e). further comprises re-forming the hole after the welding has been completed.

8. A method according to claim 1, wherein step c). comprises positioning the solid phase welding tool so as to extend part way through the thickness of the aircraft skin.

9. A method according to claim 1, wherein the method comprises repairing a skin forming a leading edge of the aircraft.

10. Solid phase welding apparatus comprising:

a base;

a solid phase welding tool;

a support for the welding tool, the support being movable on the base;

mounting means for mounting the base on a workpiece in a region to be repaired, the base being located adjacent an edge of the workpiece; and location means for locating a metal element at the edge of the workpiece.

11. Apparatus according to claim 10, further comprising adjustment means on the support for moving the tool towards the workpiece and enabling a desired depth of weld to be produced in the workpiece.

12. Apparatus according to claim 11, further comprising locking means which locks the tool in a predetermined position to provide the desired depth of weld.

13. Apparatus according to claim 12, wherein the locking means comprises a locking pin, wherein said locking means is biased towards a locking position, and is releasable from its locking position by moving it against the bias.

14. Apparatus according to claim 13, wherein the support comprises a first part and a second part, said first part is movable on the base and said second part is movably mounted on the first part and said second part carries the welding tool.

15. Apparatus according to claim 14, wherein the second part comprises an arm pivotally connected at one end to the first part and is arranged to carry the tool at its other end.

16. Apparatus according to claim 14, wherein the adjustment means controls the position of the second part and thereby the position of the tool.

17. Apparatus according to claim 14, wherein the adjustment means is operable by a depth control actuator.

18. Apparatus according to claim 10, wherein the support is movable on the base by means of a support actuator.

19. Apparatus according to claim 18, wherein the depth control actuator and the support actuator are in a control circuit and said support actuator, responsive to movement of the tool to the desired depth by the depth control actuator, moves the support.

20. Apparatus according to claim 10, further comprising clamp means for securing the apparatus to the workpiece.

21. Apparatus according to claim 20, wherein the clamp means is arranged to clamp the workpiece against the base.

22. A method of repairing an aircraft skin, the method comprising the steps of:

(a) providing solid phase welding apparatus comprising a base, a solid phase welding tool, a support for the welding tool, the support being movable on the base, mounting means for mounting the base on the aircraft skin in a region to be repaired;

(b) mounting the base of the solid phase welding apparatus to the aircraft skin in the region to be repaired so that said base is located adjacent an edge of the skin;

(c) positioning a metal element on said base at said edge of the aircraft skin adjacent the region to be repaired;

(d) introducing said solid phase welding tool between adjacent surfaces of the aircraft skin in the region to be repaired;

(e) operating the solid phase welding tool to weld the adjacent surfaces together;

(f) moving the solid phase welding tool into said metal element at the end of the welding process;

(g) removing the solid phase welding apparatus from the aircraft skin; and (h) separating the metal element from the edge of the aircraft skin.

23. A method according to claim 22 comprising repairing a crack in the aircraft skin wherein steps (d) and (e) comprise introducing a solid phase welding tool at one end of the crack and moving along the crack to create the weld, and then moving the welding tool from the other end of the crack near said edge, into said metal element.

24. Portable solid phase welding apparatus comprising:

a base;

a solid phase welding tool;

a support for the welding tool, the support being movable on the base;

mounting means for mounting the base to an edge of a workpiece in a region to be repaired;

and the base including location means for locating a metal element at said workpiece edge adjacent the region to be repaired;

and wherein the said support is movable to a position in which a welding operation can be carried out when the base is mounted to the workpiece.

25. Apparatus according to claim 24 wherein the mounting means include a plate mounted above the base so as to define a gap region into which the edge of the workpiece may be moved in order to mount the apparatus on the workpiece.

26. Apparatus according to claim 24 wherein said mounting means includes means for clamping the apparatus to the workpiece.

27. Apparatus according to claim 26 wherein the clamp means inclues apertures on the base for receiving toggle members for securing the edge of the workpiece to the base.

* * * * *